United States Patent [19]

Streeter

[11] Patent Number: 4,754,182
[45] Date of Patent: Jun. 28, 1988

[54] LINK SUSPENSION FOR A ROTOR MEMBER

[76] Inventor: Edward C. Streeter, 89 Park Place, Park Parade, Harrogate, N. Yorkshire, United Kingdom, HGI 5NS

[21] Appl. No.: 425,417

[22] Filed: Sep. 28, 1982

[51] Int. Cl.⁴ .......................................... H02K 21/12
[52] U.S. Cl. ................................. 310/156; 310/157; 310/103; 310/90
[58] Field of Search ................ 310/157, 103, 104, 90, 310/156

[56] References Cited

U.S. PATENT DOCUMENTS

| | | | |
|---|---|---|---|
| 3,113,228 | 12/1963 | Tolegian | 310/157 X |
| 3,558,948 | 1/1971 | Laing | 310/157 |
| 4,167,848 | 9/1979 | Kitai et al. | 310/103 X |

Primary Examiner—Mark O. Budd
Attorney, Agent, or Firm—Hoffmann & Baron

[57] ABSTRACT

A link suspension permitting limited rotation of a rotor in response to a magnetic control field uses a permanent magnet and support means having two contacting narrow concave curvilinear surfaces.

6 Claims, 2 Drawing Sheets

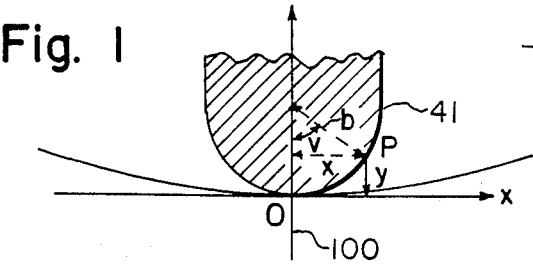
Fig. 1
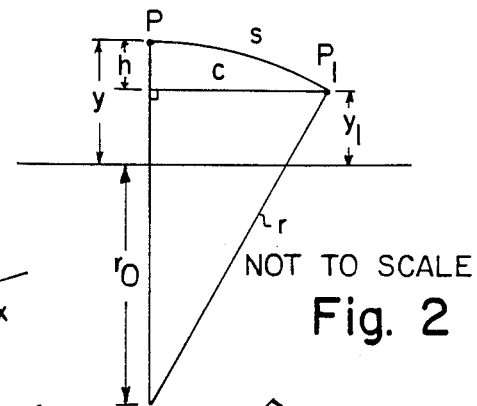
NOT TO SCALE
Fig. 2
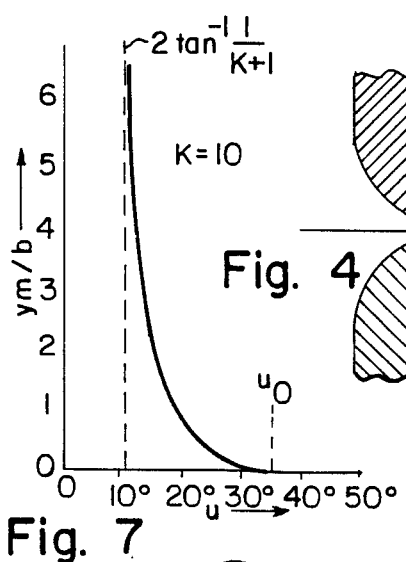
Fig. 7
Fig. 4
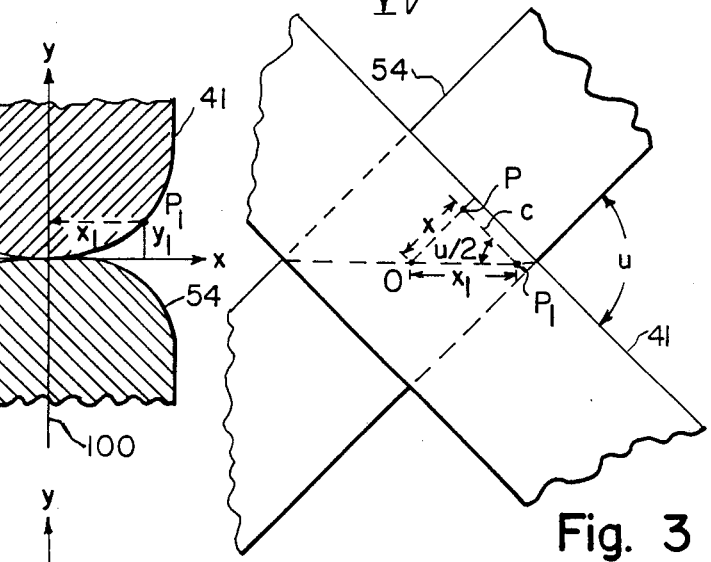
Fig. 3
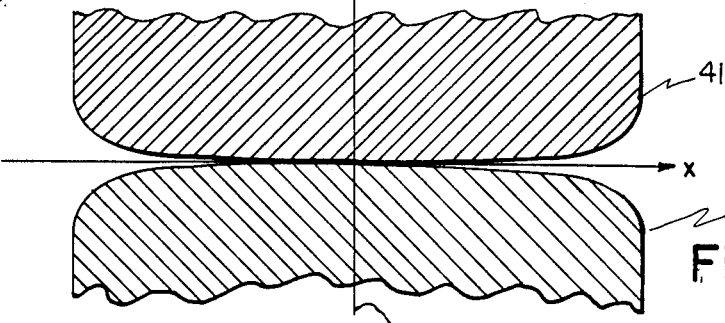
Fig. 5
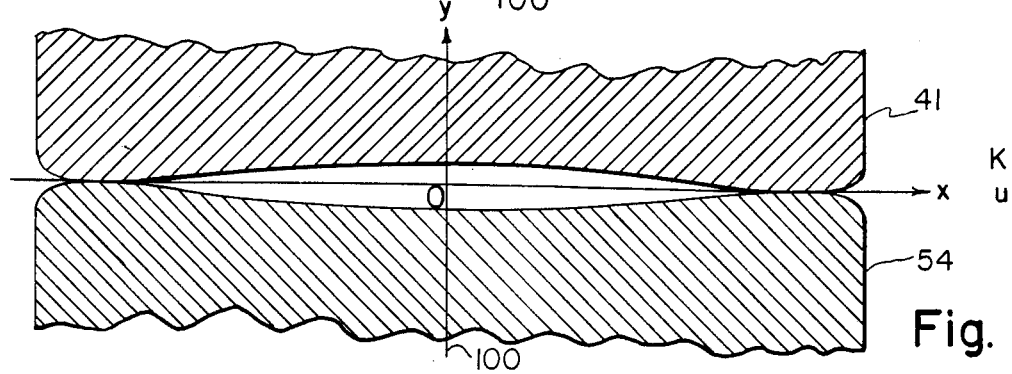
Fig. 6

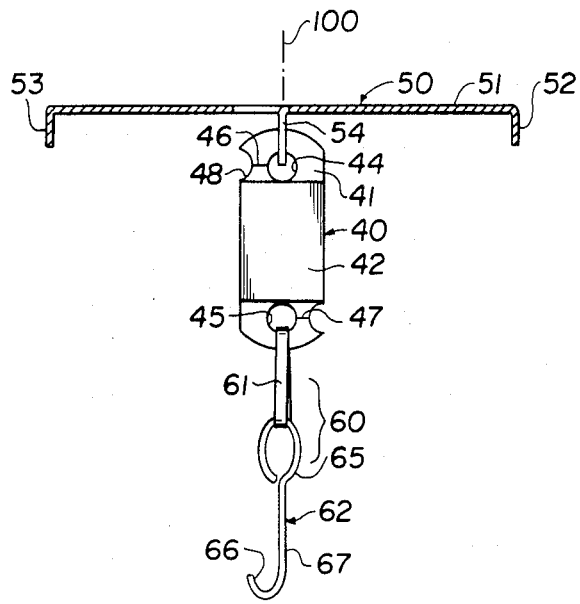
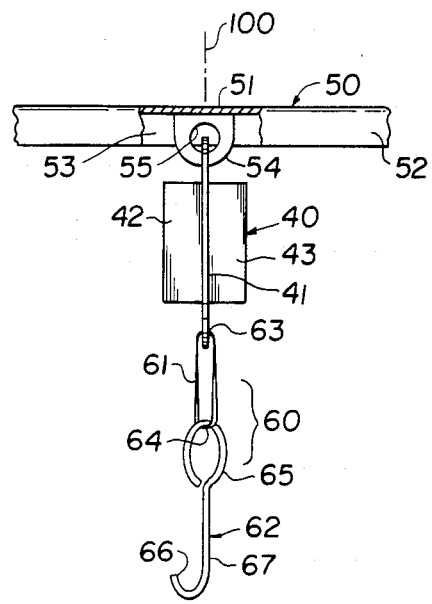
FIG.8A
FIG.9A
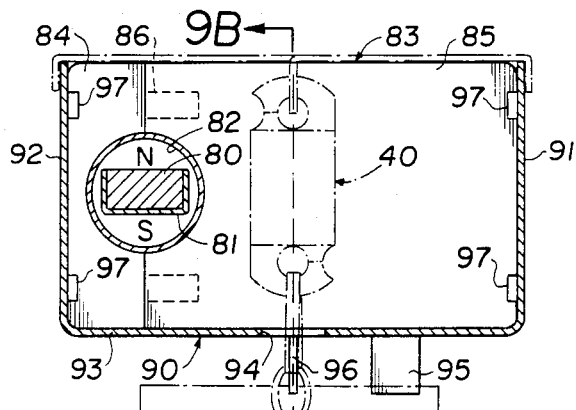
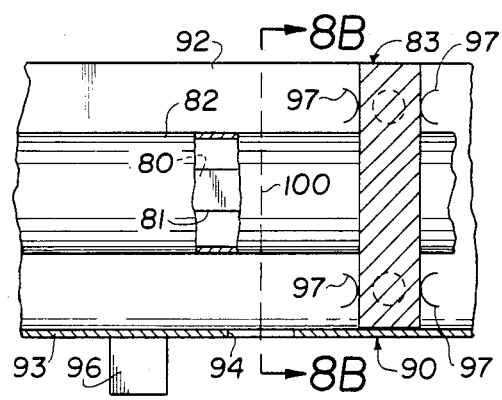
FIG.8B
FIG.9B
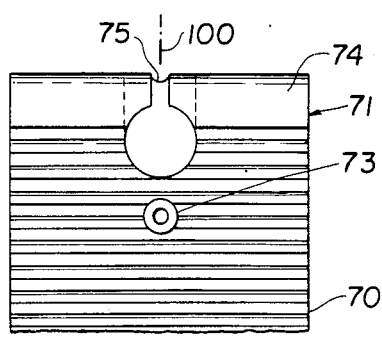
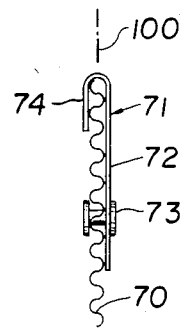
FIG.8C
FIG.9C

LINK SUSPENSION FOR A ROTOR MEMBER

RELATED APPLICATIONS

This application is a companion case with applicant's application Ser. No. 06/511,757, filed July 7, 1983, entitled Apparatus for Directing Permanent Magnet Rotors by Rotation of a Permanent Magnet Control Field.

BACKGROUND OF THE INVENTION

1. Field of the Invention

This invention concerns suspensions permitting limited turning of a rotor that is held under tension and subjected to a controlling torque.

The primary object of the invention is to provide very inexpensive suspension for a permanent magnet rotor that is coupled to a source of tension, such as a longitudinally tensioned louver in an array of magnetically controlled louvers.

2. Description of the Prior Art

The applicant's U.S. Pat. No. 3,742,648 discloses a link suspension for an array of powered louvers in which pivot pins are received in concave dimples to afford low frictional torque and obviate unwanted restoring torques which increase with the angle of rotation. The prior art is rich in such pivot designs and their derivatives in which a convex bearing surface is received in a concave bearing surface. The use of two engaging and opposing concave surfaces in such bearings is not found.

Common experience with chains teaches that despite the facility of adjacent links to assume large angles relative to each other in orthogonal planes, links that are under tension repose with the planes that contain their narrow dimensions mutually perpendicular and resist twisting with a mechanical restoring torque that increases rapidly as the angle of torsion between the links increases.

SUMMARY OF THE INVENTION

It is therefore unexpected that linked members can serve as a self-aligning sensitive rotational suspension offering low frictional torque. We will show that if the ratio of the radii of curvature of the contacting surfaces is sufficiently large relative to the half-width of the surfaces and these surfaces have rounded rather than sharp edges when viewed in cross section, no mechanical restoring torque exists over a useful range of rotational angles.

Accordingly, the present invention is embodied in a link suspension permitting limited rotation of a rotor in response to a magnetic control field, comprising a permanent magnet having a lamellar armature, a supporting member having a narrow concave curvilinear supporting surface, a narrow concave curvilinear supported surface in said armature, and coupling means for connecting said armature to a source of tension for holding said concave surfaces in contact.

The half-width of each contacting surface is an order of magnitude smaller than its radius. Since large radii of curvature decrease the accuracy with which the rotor is centered on its axis of rotation, the desired ratio is achieved by employing as thin material as practical, and this also reduces frictional torque.

The supported surface in the rotor armature may be formed by a hole adjacent an edge. The supporting member may be a loop of fine wire or, like the rotor armature, comprise a thin metal plate having a hole therein adjacent an edge and either fixed or rotatably coupled to a frame. The holes may conveniently be circular, and a slit is provided in the supporting member or the rotor armature to permit interconnection of the holes therein.

The edges of the concave curvilinear surfaces are perferably fully rounded to produce a shape adjacent the axis of rotation generally similar to the inner circumferential half of a torus having a roughly semicircular cross section with a radius equal to the half-width of the surfaces. This configuration can be easily achieved by shot-peening a punched hole. Thus, the area of contact between the supporting stator surface and the rotor armature is very small when the narrow dimensions of the two surfaces are mutually perpendicular, and the area is determined primarily by the allowable maximum contact pressure and the moduli of elasticity of the materials.

BRIEF DESCRIPTION OF THE DRAWINGS

FIG. 1 is a greatly enlarged detail of a cross section of a rotor armature 41 parallel to its thickness dimension at the point of contact with a supporting stator 54.

FIG. 2 is a diagram illustrating the geometrical relationship of certain mathematical terms.

FIG. 3 is a detail on the same scale as FIG. 1 of the rotor and stator viewed parallel to the axis of rotation, showing the line of symmetry along which contact is made, and illustrating the geometrical relationship of further terms.

FIG. 4 is a detail on the same scale as FIG. 1 of a section of the rotor and stator taken along the line of symmetry of FIG. 3 and revealing the outline of the contacting surfaces corresponding to a right angle $u=90°$ between the rotor and stator.

FIG. 5 is a detail on the same scale as FIG. 1 of the outline of the contacting surfaces corresponding to $u=37.5°$.

FIG. 6 is a detail on the same scale as FIG. 1 of the outline of the contacting surfaces corresponding to $u=25°$, showing the separation of the rotor from the stator along the axis of rotation and thereby revealing the presence of a mechanical restoring torque.

FIG. 7 is a graph of the curve $y_m/b=f(u)$, which has a slope proportional to the mechanical restoring torque.

FIG. 8A is a view of a typical link suspension according to the present invention showing a rotor supported by its armature from a beam cover plate which is adapted to nest on the beam of FIG. 8B.

FIG. 8B is a cross-sectional view of a beam for housing the rotor of FIG. 8A in operative relationship to a rotatable permanent control magnet.

FIG. 8C is a view in plan of an axially resilient louver, which is a source of tension for the rotor of FIG. 8A to which it attaches when the three component parts of FIGS. 8A, 8B and 8C are assembled.

FIG. 9A is a side view of the link suspension of FIG. 8A.

FIG. 9B is a side view of the beam of FIG. 8B with portions broken away to reveal the control magnet.

FIG. 9C is an edge view of the louver of FIG. 8C.

A Nomenclature is included to clarify the mathematical terms employed in a brief study of the operation of the invention. Needless complexity is avoided by assuming that the contacting surfaces of the rotor and stator are identical and consequently share two orthogonal planes of symmetry that intersect to form a line of symmetry on which contact occurs. The Y axis is coaxial with the rotational axis of the rotor, and the X axis is perpendicular to the rotational axis and coplanar with a rotor-stator plane of symmetry.

NOMENCLATURE

P=a point on the semi-circumference of the cross section of the rotor.
$P_1$=a point on the line of symmetry formed by the intersection of the planes of rotor-stator symmetry.
x,y=coordinates of P.
$x_1,y_1$=coordinates of $P_1$.
$y_m$=minimum value of $y_1$ when $dy_1/dv$= O.
$r_o$=radius of the opposed concave circular arcs that pass through the origin 0.
r=radius of the circular arc s extending between points P and $P_1$.
b=half-width of the rotor and stator surfaces.
K=$r_o$/b.
c=half chord of arc s.
h=the rise from half-chord c to arc s.
v=angle between Y axis and a radius of length b extending from a center x=0, y=b to P.
$v_m$=value of v when $dy_1/dv$= O.
u=angle of rotation between the rotor and stator.
$u_o$=limiting value of u for the existence of a mechanical restoring torque $T_m$.

BASIC THEORY OF OPERATION

Referring to FIG. 1, we observe that $$= b \sin v \text{ and } y = b(1 - \cos v)$$

while from FIG. 2 we note that $$= r_o + y, \ h = r - \sqrt{r^2 - c^2}, \text{ and } {}_1 = y - h,$$

and finally FIG. 3 shows that $$c = \frac{x}{\tan(u/2)} \text{ and } x_1/b = \frac{\sin v}{\sin(u/2)}.$$

Given $r_o = Kb$, we can eliminate x, y, $r_o$, r, h and c and arrive at $$_1/b = -K + \sqrt{(K+1-\cos v)^2 - \sin^2 v / \tan^2(/2)} \quad (1)$$

Now that we know $x_1/b$ and $y_1/b$ we can draw the outlines of the sections of the rotor 41 and stator 54 cut along the line of symmetry and extending outwardly from the axis of rotation where contact first occurs. FIG. 4 corresponds to a right angle u=90° between the rotor 41 and stator 54 shown in FIG. 3. As the angle u decreases the outlines gradually broaden as shown in FIG. 5, and the curvatures at the origin become progressively less until at a limiting angle $u_o$ a stationary point is reached where the outlines have zero slope and no curvature. This limiting angle $u_o$ is determined by taking the derivative of $y_1/b$ with respect to v and equating to zero. Thus $$\cos v_m = \frac{K+1}{1 + \frac{1}{\tan^2(u/2)}} \quad (2)$$

At the origin, $v_m$=0 and $$_o = 2 \tan^{-1} \sqrt{1/K} \quad (3)$$

A mechanical restoring torque arises in addition to the frictional torque when the rotor is turned to angles less than $u_o$. The stationary point corresponding to the angle $v_m$ is forced away from the axis of rotation in accordance with equation (2) and is observed to be a point at which $y_1$ is a minimum $y_m$ with a negative sign. However, negative values of $y_m$ cannot exist physically because $y_1$=O represents contact between the rotor and stator. Accordingly, the rotor is displaced axially relative to the stator a distance equal to twice the absolute value of $y_m$ against a tensional force F. The work done opposing the mechanical restoring torque $T_m$ in turning the rotor from the angle u to the angle u+Δu is $T_m$Δu and equal to the associated slight increase in potential energy 2FΔ$y_m$. Accordingly, $$T_m = \frac{2F\Delta y_m}{\Delta u} \quad (4)$$

where Δu is measured in radians. FIG. 6 shows typical outlines of the rotor 41 and stator 54 contacting surfaces under this condition.

If we draw the graph of $y_m/b$=f(u) as in FIG. 7, the mechanical restoring torque $T_m$ is proportional to the slope of the curve and is equal to the product of the slope and a proportionality constant 2Fb when u is measured in radians. Although the torque $T_m$ does not appear until $u_o$=35.1° when K=10, it rises rapidly with further decrease in the angle u. For example, given F=100 gms. and b=0.01 cm., $T_m$=2.55 gm.-cms. at u=30° and 7.22 gm.-cms. at u=25° and increases without limit as u approaches $$2 \tan^{-1}\left(\frac{1}{K+1}\right),$$

which in this case is 10.4°.

DETAILED DESCRIPTION OF A PREFERRED EMBODIMENT

The embodiment of the invention chosen for describing in detail is a link suspension suitable for use in large numbers in an array of specularly reflective louvers are supported only at their ends for rotation about parallel uniformly spaced horizontal axes and sealed in the air space of a dual-glazed window or skylight. Each end of every louver is attached to a separate permanent magnet rotor that is housed in a beam at the left or right side of the dual-glazed unit. Mutual magnetic coupling between the rotors tends to maintain them in a common attitude of repose. However, the attitude of each louver is adjustable by a pair of permanent control magnets rotatable in unison, one control magnet common to all the rotors in the left beam and the other common to all the rotors in the right beam.

A typical link suspension is shown in FIGS. 8 and 9 comprising a rotor 40 having a lamellar rotor armature 41 supported by a beam cover 50 for limited rotation about an axis 100 and provided with coupling means 60 for connecting the armature to an axially tensioned louver 70. A pair of permanent rotor magnets 42 and 43 are fixed to opposite faces of the armature 41 and produce a magnetic flux perpendicular to the axis of rotation. A permanent control magnet 80 is rotatably mounted in a beam 90 in a position to be in operative relationship to the rotor magnets 42 and 43 when the beam cover 50 is in place.

The rotor armature 41 is an approximately rectangular plate of thin, spring-temper metal provided with a pair of circular holes 44 and 45, one at each end of the plate centered on the axis of rotation. Closed slits 46 and 47 extend perpendicularly to this axis from the holes 44 and 45, respectively, to opposite outside edges of the armature 41. The rotor magnets 42 and 43 are made of rubber-bonded barium ferrite flat strips having a high tack, pressure sensitive adhesive layer on the surface in contact with the armature 41. The magnets 42 and 43 extend axially between the inner edges of the holes 44 and 45 and have a width coextensive with the armature. The thickness of each magnet is approximately one half its width; consequently the cross section of the rotor perpendicular to the axis 100 of rotation is substantially square.

The beam cover 50 comprises a thin, spring-temper elongated metal strip 51 having parallel edges bent at right angles to the strip 51 to form stiffening lips 52 and 53. A tab 54 containing a circular hole 55 projects perpendicularly from the strip toward the rotor armature 41. The tab 54 aligns with the longitudinal centerline of the strip 51 and is conveniently formed by slitting the strip 51 in approximately a semicircular outline and bending the slit portion about the longitudinal centerline. The hole 44 in the armature 41 is linked to the hole 55 in the tab 54, access being obtained by momentarily springing open the slit 46. This operation is facilitated by a notch 48 at the outside edge of the slit 46.

The coupling means 60 comprises a metal connecting loop 61 linked to a louver fastener 62 of bent wire. The loop 61 has an elongated oval shape with narrow parallel sides joined at either end by identical tight return bends 63 and 64. The return bend 63 is hung on the circumference of the armature hole 45 after the slit 47 is sprung open to give access. The return bend 64 supports a circular eye 65 of the louver fastener 62. The connecting loop 61 is sufficiently torsionally rigid to transmit rotation of the armature 41 to the eye 65. A permanent twist is formed in the connecting loop 61 to provide a desired angular relationship between the plane of the armature 41 and the plane of the eye 65.

Referring particularly to FIGS. 8B and 9B, the beam 90 is a channel of sheet steel having a rectangular U-shaped cross section comprising parallel flanges 91 and 92 separated by a web 93. A circular hole 94 centered on the longitudinal centerline of the beam 90 perforates the web 93. The diameter of the hole 94 is sufficient to allow passage of the eye 65 of the fastener 62. A louver opening limit stop 95 and a closing limit stop 96 are provided for the louver 70 in the form of rectangular tabs slit and bent from the web 93. The stop 96 is located on the longitudinal centerline of the beam 90 midway between the rotational axes 100 of adjacent louvers. The stop 95 lies on a radius projected from the center of the hole 94 that is horizontal when the beam 90 is installed in its final position in a building. The stops 95 and 96 force the louvers to assume a uniform horizontal or a uniform closed attitude at the extremities of the rotation of each louver.

The permanent control magnet 80 is a continuous long strip of rubber-bonded barium ferrite having a rectangular cross section that is uniformly magnetized through its thickness dimension. The magnet 80 is protected by a channel 81 of non-magnetic material and is inserted into a thin-walled cylindrical aluminum tube 82. The tube 82 extends the full length of the beam 90 past all the permanent magnet rotors 40 (not shown) and is supported where needed by bearings. A typical bearing 83 is a rectangular partition of plastics material having a low frictional coefficient. The bearing 83 extends transversely across the interior of the beam 90 and is fixed in position midway between adjacent rotor axes by dimples 97 projecting from the inside surfaces of the flanges 91 and 92. The bearing 83 is split into two parts 84 and 85 to provide two halves of a cylindrical bushing loosely surrounding the tube 82. Dowels 86 maintain the parts 84 and 85 in alignment.

Referring now to FIGS. 8C and 9C, the louver 70 is made of a corrugated ribbon of spring-temper, high-strength aluminum foil. The axes of the corrugations extend parallel to the width of the louver to stiffen the louver transversely and to render it longitudinally resilient. An analysis of this type of louver is contained in U.S. Pat. No. 3,342,244, granted Sept. 19, 1967. A thin layer of pure aluminum is deposited on the alloy substrate of the louver to optimize its specular reflectance.

A louver terminal 71 protects the end of the louver 70 and provides means for attaching the eye 65 of the fastener 62 to the louver 70. The terminal 71 has a rectangular flat plate portion 72, which is secured against a face of the louver 70 by an eyelet 73 centered on the rotational axis, and a narrow transverse rim 74 formed by a U-bend, which extends from the plate portion around the extreme transverse edge of the louver. The end of the louver nests within the rim 74 except adjacent the rotational axis where the rim 74 and the louver 70 are cut away by notches 75 and 76, respectively, sufficiently to accomodate the connecting loop 61 and to permit the eye 65 to lie parallel to and against the plate portion 72.

Assembly of the beam cover 50, beam 90 and louver 70 is facilitated by the provision of a hook 66 at the end of a shank 67 attached to the eye 65 of the louver fastener 62. A fixture (not shown) holds the rotor armature 41 on the axis of rotation 100 until the hook 66 projects through the hole 94 and can be gripped. The fixture is then withdrawn, and the cover 50 is placed against the beam 90 with the lips 52 and 53 overlapping the flanges 91 and 92, respectively. The cover 50 is temporarily deflected toward the interior of the beam 90 until the rotor armature 41 contacts the inside of the web 93. This deflection provides adequate clearance between the eye 65 and the outside of the web 93 to permit the eye 65 to be received in the notch 76 of the louver and slid into the pocket formed by the rim 74. Releasing the inward deflection of the cover 50 draws the terminal 71 of the now attached louver 70 sufficiently close to the web 93.

The metal thickness of the beam cover 50 and the rotor armature 41 is necessarily greatly exaggerated in the drawings. A typical suspension employs contacting surfaces each having a half-width of about 0.1 mm. The bearing characteristics are improved by using dissimilar metals. The cover 50 may be made of stainless steel and the armature 41 may be made of beryllium copper, both tempered to very high tensile strength. The edges of the contacting surfaces are fully rounded to give convexity parallel to the narrow dimension and all burr removed by suitable shot peening.

I claim:

1. A link suspension permitting limited rotation of a rotor in response to a magnetic control field, comprising, a permanent magnet rotor having a lamellar armature, a supporting member having a narrow concave curvilinear supporting surface, a narrow concave curvilinear supported surface in said armature, and coupling means for connecting said armature to a source of tension for holding said concave surfaces in contact.

2. A link suspension according to claim 1 wherein the width of each contacting surface is an order of magnitude smaller than its radius of curvature.

3. A link suspension according to claim 1, wherein said coupling means comprises a torsionally rigid connector for securing an end of a tensioned louver.

4. A link suspension permitting limited rotation of a rotor in response to a magnetic control field, comprising a thin plate-like rotor armature, means fixed to said armature producing a permanent magnetic field, a supporting member having a narrow concave curvilinear supporting surface, a concave curvilinear supported surface in said armature provided by a hole adjacent an edge thereof, and coupling means for connecting said armature to a source of tension for holding said surfaces in contact, each of said surfaces being convex parallel to its narrow dimension, the radius of its convexity being an order of magnitude smaller than the radius of its concavity.

5. A link suspension according to claim 4, wherein said supporting member is a thin metal plate having a hole therein, and further comprising a slit in one of the plates for interconnecting the holes therein.

6. A link suspension according to claim 4, wherein the means producing a permanent magnetic field comprises a pair of permanent magnets, one attached to each face of said rotor armature, for creating a magnetic field perpendicular to the axis of rotation, thereby producing a control torque on said rotor in the presence of a magnetic control field.

* * * * *

UNITED STATES PATENT AND TRADEMARK OFFICE
CERTIFICATE OF CORRECTION

PATENT NO. : 4,754,182

DATED : June 28, 1988

INVENTOR(S) : Edward C. Streeter

It is certified that error appears in the above-identified patent and that said Letters Patent is hereby corrected as shown below:

Column 3, line 32, insert --x-- before "=b";

line 36, insert --r-- before "=$r_o$+y," and insert --y-- before "$_1$=y-h,";

line 46, insert --y-- before "$_1$/b=-K+" and insert --u-- before "/2).";

line 68, insert --u-- before "$_o$=2tan$^{-1}$ 1/K";

Column 4, line 11, change "disctance" to --distance--.

Signed and Sealed this

Seventeenth Day of January, 1989

*Attest:*

DONALD J. QUIGG

*Attesting Officer*     *Commissioner of Patents and Trademarks*